Patented Sept. 29, 1942

2,297,523

UNITED STATES PATENT OFFICE 2,297,523

TITANIUM DIOXIDE PIGMENT AND METHOD OF MAKING SAME

Benjamin Wilson Allan and William Everett Land, Baltimore, Md., assignors to American Zirconium Corporation, Baltimore, Md., a corporation of Maryland No Drawing. Application October 14, 1941, Serial No. 414,974

20 Claims. (Cl. 106—300)

This application is a continuation-in-part of our applications Ser. No. 297,814, filed October 4, 1939, and Ser. No. 350,127, filed August 2, 1940.

The present invention relates to titanium pigments, and has particular reference to titanium dioxide having improved weather resistance as well as other desirable properties.

It is known that titanium dioxide and certain other pigments have a tendency to yellow upon aging and that they also have a tendency to chalk. Various expedients have been employed to overcome or lessen these tendencies, such as treatment of the pigment with oxides and hydroxides of various metals like aluminum, tin, etc. These treatments have been more or less successful, but have not been all that might be desired, and the procedures employed have not been particularly efficient.

It is accordingly an object of the present invention to provide an improved process for treating pigments such as titanium dioxide to improve the resistance to fading and to give the pigments other desirable properties.

Another object is to produce a pigment having improved resistance to fading, etc.

Another object is to provide a more economical and efficient method for treating pigments to improve the resistance to fading and produce other desirable properties in the pigment.

According to the present invention the pigment, such as titanium dioxide, is treated in slurry form with a hydrolizable salt, preferably one which forms white hydroxides, and the salt is hydrolyzed to precipitate the hydroxide upon the pigment particles. When the hydroxide is precipitated upon the pigment particles in this manner, a thin practically continuous uniform coating is formed upon the pigment particles which is very effective in accomplishing the desired results. It is known, for example, to precipitate aluminum hydroxide and mix the precipitated hydroxide with a slurry of calcined titanium dioxide. It has also been proposed to treat the titanium dioxide in a slurry containing in solution a basic aluminum salt. In both of these procedures the treated pigment shows an improved resistance to lithographic breakdown. However, the effectiveness of the treatment depends in a large part upon occlusion of the basic aluminum compound on the pigment particles. This results in a discontinuous coating, and the use of much larger amounts than are required by the present invention to produce the same results.

The invention may be practiced employing various salts of metals such as aluminum, bismuth, tin and antimony. The acids in the salts used are preferably volatile, and the easier the salts are to hydrolyze the better. By employing salts of volatile acids, the acid formed is easily removed and it is not necessary to wash the treated pigments to remove soluble salts and acids. Such salts as the chlorides, acetates, sulfates, etc. may be used with substantially like results, but as mentioned, the salts of volatile acids, namely, the chlorides, formates, acetates, propionates and butyrates, have the advantage that the acids may be readily volatilized off during the hydrolysis.

Example I

A slurry of calcined titanium dioxide in water containing 100 grams $TiO_2$ per liter is prepared and 2.1 grams of aluminum acetate per liter of slurry are added. The resulting slurry is then agitated for about one hour to thoroughly soak the $TiO_2$ pigment particles with the aluminum acetate and to effect thorough penetration of the aluminum acetate into the interstices of the pigment particles. The slurry is then boiled to completely hydrolyze the aluminum acetate upon the surface of the titanium pigment particles as well as the aluminum acetate penetrated into the interstices of the pigment particles, whereby there is formed upon the surface of these pigment particles and within the interstices thereof deposits of the solid product of hydrolysis. During this boiling, all of the aluminum hydroxide is precipitated and the acetic acid volatilized. The slurry is then filtered and dried. The pigment produced contains 0.5% of solid product of hydrolysis. This pigment when used in an ink is as effective in preventing lithographic breakdown as a titanium dioxide pigment containing 1.5% of previously precipitated aluminum hydroxide calculated as aluminum oxide and mechanically admixed with the titanium pigment. The pigment also shows improved weather resistance, improved gloss, and greater resistance to yellowing over the untreated pigment.

Example II 2,000 grams of calcined titanium dioxide are slurried in 10 liters of water and then 42 grams of finely powdered stannous chloride ($SnCl_2$) are added. The resulting slurry is then vigorously agitated for about one hour to thoroughly soak the $TiO_2$ pigment particles with the $SnCl_2$ and to effect thorough penetration of the $SnCl_2$ into the interstices of the pigment particles. The slurry is then boiled to completely hydrolyze the $SnCl_2$ upon the surface of the titanium pigment particles as well as the $SnCl_2$ penetrated into the interstices of the pigment particles, whereby there is formed upon the surface of these pigment particles and within the interstices thereof deposits of the solid product of hydrolysis. The slurry is filtered, dried and ground. The finished pigment contains 1.5% solid product of hydrolysis. This material mixes well with vehicles and shows great resistance to chalking and weathering when incorporated in outside paints.

*Example III*

20 kilograms of calcined titanium dioxide is slurried in 100 liters of water and agitated thoroughly. The resulting slurry is brought to a boil and slowly, over a period of one hour, a total of 600 grams of antimony trichloride is added to it, the slurry being vigorously stirred during the addition of the antimony trichloride to thoroughly soak the $TiO_2$ pigment particles with the antimony trichloride and to effect thorough penetration of the antimony trichloride into the interstices of the pigment particles. After the antimony trichloride has been completely added, boiling is continued for one hour to completely hydrolyze the antimony trichloride upon the surface of the titanium pigment particles as well as the antimony trichloride penetrated into the interstices of the pigment particles, whereby there is formed upon the surface of these pigment particles and within the interstices thereof deposits of the solid product of hydrolysis. The slurry is next filtered, dried, and ground. The finished pigment contains 1.5% solid product of hydrolysis. This pigment is highly resistant to chalking, weathering and fading when used in natural and synthetic paint and enamel vehicles.

*Example IV*

To a slurry of calcined titanium dioxide in water containing 100 grams $TiO_2$ per liter is added 1.6 grams of aluminum formate per liter of slurry. The resulting slurry is then vigorously agitated for about one hour to thoroughly soak the $TiO_2$ pigment particles with the aluminum formate and to effect thorough penetration of the aluminum formate into the interstices of the pigment particles. The slurry is then boiled to completely hydrolyze the aluminum formate upon the surface of the titanium pigment particles as well as the aluminum formate penetrated into the interstices of the pigment particles, whereby there is formed upon the surface of these pigment particles and within the interstices thereof deposits of the solid product of hydrolysis. The slurry is filtered, dried and ground.

*Example V*

To a slurry of calcined titanium dioxide in water containing 100 grams $TiO_2$ per liter is added 2.5 grams of aluminum propionate per liter of slurry. The resulting slurry is then vigorously agitated for about one hour to thoroughly soak the $TiO_2$ pigment particles with the aluminum propionate and to effect thorough penetration of the aluminum propionate into the interstices of the pigment particles. The slurry is then boiled to completely hydrolyze the aluminum propionate upon the surface of the titanium pigment particles as well as the aluminum propionate penetrated into the interstices of the pigment particles, whereby there is formed upon the surface of these pigment particles and within the interstices thereof deposits of the solid product of hydrolysis. The slurry is filtered, dried and ground.

*Example VI*

To a slurry of calcined titanium dioxide in water containing 100 grams $TiO_2$ per liter is added 2.9 grams of aluminum butyrate per liter of slurry. The resulting slurry is then vigorously agitated for about one hour to thoroughly soak the $TiO_2$ pigment particles with the aluminum butyrate and to effect thorough penetration of the aluminum butyrate into the interstices of the pigment particles. The slurry is then boiled to completely hydrolyze the aluminum butyrate upon the surface of the titanium pigment particles as well as the aluminum butyrate penetrated into the interstices of the pigment particles, whereby there is formed upon the surface of these pigment particles and within the interstices thereof deposits of the solid product of hydrolysis. The slurry is filtered, dried and ground.

*Example VII*

To a slurry of calcined titanium dioxide in water containing 100 grams $TiO_2$ per liter is added 1.8 grams of stannous acetate per liter of slurry. The resulting slurry is then vigorously agitated for about one hour to thoroughly soak the $TiO_2$ pigment particles with the stannous acetate and to effect thorough penetration of the stannous acetate into the interstices of the pigment particles. The slurry is then boiled to completely hydrolyze the stannous acetate upon the surface of the titanium pigment particles as well as the stannous acetate penetrated into the interstices of the pigment particles, whereby there is formed upon the surface of these pigment particles and within the interstices thereof deposits of the solid product of hydrolysis. The slurry is filtered, dried and ground.

*Example VIII*

To a slurry of calcined titanium dioxide in water containing 100 grams $TiO_2$ per liter is added 1 gram of antimony acetate per liter of slurry. The resulting slurry is then vigorously agitated for about one hour to thoroughly soak the $TiO_2$ pigment particles with the antimony acetate and to effect thorough penetration of the antimony acetate into the interstices of the pigment particles. The slurry is then boiled to completely hydrolyze the antimony acetate upon the surface of the titanium pigment particles as well as the antimony acetate penetrated into the interstices of the pigment particles, whereby there is formed upon the surface of these pigment particles and within the interstices thereof deposits of the solid product of hydrolysis. The slurry is filtered, dried and ground.

*Example IX*

To a slurry of calcined titanium dioxide in water containing 100 grams $TiO_2$ per liter is added 1.2 grams of bismuth chloride per liter of slurry. The resulting slurry is then vigorously agitated for about one hour to thoroughly soak the $TiO_2$ pigment particles with the bismuth chloride and to effect thorough penetration of the bismuth chloride into the interstices of the pigment particles. The slurry is then boiled to completely hydrolyze the bismuth chloride upon the surface of the titanium pigment particles as well as the bismuth chloride penetrated into the interstices of the pigment particles, whereby there is formed upon the surface of these pigment particles and within the interstices thereof deposits of the solid product of hydrolysis. The slurry is filtered, dried and ground.

Example X

To a slurry of calcined titanium dioxide in water containing 100 grams TiO₂ per liter is added 1.1 grams of bismuth propionate per liter of slurry. The resulting slurry is then vigorously agitated for about one hour to thoroughly soak the TiO₂ pigment particles with the bismuth propionate and to effect thorough penetration of the bismuth propionate into the interstices of the pigment particles. The slurry is then boiled to completely hydrolyze the bismuth propionate upon the surface of the titanium pigment particles as well as the bismuth propionate penetrated into the interstices of the pigment particles, whereby there is formed upon the surface of these pigment particles and within the interstices thereof deposits of the solid product of hydrolysis. The slurry is filtered, dried and ground.

The pigments treated in accordance with the present invention show increased resistance to lithographic breakdown, improved weather resistance, improved resistance to yellowing, and improved mixing qualities in paint and similar vehicles. Due to the uniform continuous thin coating of the solid product of the hydrolysis, less of this coating is required and the results obtained are generally better than when the hydroxide is mechanically introduced or when such soluble salts as basic aluminum salts are employed. For example, in this so-called lithographic breakdown test in which a lithographic ink is strongly agitated with water or dilute chromic acid solution, that product made from the basic aluminum salt is prone to break down and disperse in the water, whereas the solid product of hydrolysis made according to the present invention remains stable.

In the use of aluminum hydroxide, for example, which is coated upon the pigment particles by hydrolysis of an aluminum salt as contrasted with that obtained by neutralizing an aluminum salt with alkali, several outstanding advantages are offered. In the first place, appreciably less treatment is necessary when the aluminum hydrate is hydrolized upon the pigment. Secondly, the aluminum hydrate obtained by the hydrolysis method is free of alkali metal salts which are difficult to remove. Thirdly, when an aluminum salt of a volatile acid, such as the acetate or chloride, is used, during the hydrolysis and subsequent drying of the coated product the acid component is driven off. Also a much finer, more uniform and continuous sheath of aluminum hydrate or equivalent coating is put over the pigment particles by the hydrolysis method.

It is not always necessary to boil to effect hydrolysis, as in some cases the salt will hydrolyze merely upon agitation in the presence of water; also, the salt may not always be in solution as hydrolysis may be effected from the solid state in some instances.

The present invention is not limited to the specific details set forth in the foregoing examples which should be construed as illustrative and not by way of limitation, and in view of the numerous modifications which may be effected therein without departing from the spirit and scope of this invention, it is desired that only such limitations be imposed as are indicated in the appended claims.

We claim as our invention:

1. A pigment comprising titanium dioxide pigment the particles of which have deposited upon the surface and within the interstices thereof the solid product of the complete hydrolysis of a salt of a metal other than titanium whose hydroxide is white.

2. A pigment comprising titanium dioxide pigment the particles of which have deposited upon the surface and within the interstices thereof the solid product of the complete hydrolysis of an aluminum salt.

3. A pigment comprising titanium dioxide pigment the particles of which have deposited upon the surface and within the interstices thereof the solid product of the complete hydrolysis of an antimony salt.

4. A pigment comprising titanium dioxide pigment the particles of which have deposited upon the surface and within the interstices thereof the solid product of the complete hydrolysis of a tin salt.

5. A pigment comprising titanium dioxide pigment the particles of which have deposited upon the surface and within the interstices thereof the solid product of the complete hydrolysis of a salt of a volatile acid selected from the group consisting of hydrochloric, formic, acetic, propionic and butyric acids and of a metal other than titanium whose hydroxide is white.

6. A pigment comprising titanium dioxide pigment the particles of which have deposited upon the surface and within the interstices thereof the solid product of the complete hydrolysis of a salt of a volatile acid selected from the group consisting of hydrochloric, formic, acetic, propionic and butyric acids and of a metal selected from the group consisting of aluminum, antimony, tin and bismuth.

7. A pigment comprising titanium dioxide pigment the particles of which have deposited upon the surface and within the interstices thereof the solid product of the complete hydrolysis of a salt of aluminum and of a volatile acid selected from the group consisting of hydrochloric, formic, acetic, propionic and butyric acids.

8. A pigment comprising titanium dioxide pigment the particles of which have deposited upon the surface and within the interstices thereof the solid product of the complete hydrolysis of a salt of antimony and of a volatile acid selected from the group consisting of hydrochloric, formic, acetic, propionic and butyric acids.

9. A pigment comprising titanium dioxide pigment the particles of which have deposited upon the surface and within the interstices thereof the solid product of the complete hydrolysis of a salt of tin and of a volatile acid selected from the group consisting of hydrochloric, formic, acetic, propionic and butyric acids.

10. The process of improving the resistance to weathering, chalking, fading and discoloration of titanium dioxide pigment which comprises depositing by hydrolysis upon the surface and in the interstices of the titanium dioxide pigment particles a white hydroxide of a metal other than titanium.

11. The process of improving the resistance to weathering, chalking, fading and discoloration of titanium dioxide pigment which comprises forming an aqueous slurry of the titanium dioxide pigment containing an easily hydrolizable salt of a metal other than titanium whose hydroxide is white and thoroughly soaking the titanium dioxide pigment particles with said salt, and then boiling to completely hydrolize the salt upon the surface of said particles and the salt penetrated into the interstices of said particles to form upon the surface of said particles and within the interstices thereof deposits of the solid product of the hydrolysis.

12. The process of improving the resistance to weathering, chalking, fading and discoloration of titanium dioxide pigment which comprises forming an aqueous slurry of the titanium dioxide pigment containing in solution an easily hydrolizable salt of a volatile acid and a metal other than titanium whose hydroxide is white, thoroughly soaking the titanium dioxide pigment particles with said salt, then boiling to completely hydrolize the salt upon the surface of said particles and the salt penetrated into the interstices of said particles to form upon the surface of said particles and within the interstices thereof deposits of the solid product of the hydrolysis and drying the pigment.

13. The process of improving the resistance to weathering, chalking, fading and discoloration of titanium dioxide pigment which comprises depositing in situ upon the surface and in the interstices of the titanium dioxide pigment particles the solid product of the complete hydrolysis of a salt of a volatile acid selected from the group consisting of hydrochloric, formic, acetic, propionic and butyric acids and of a metal other than titanium whose hydroxide is white.

14. The process of improving the resistance to weathering, chalking, fading and discoloration of titanium dioxide pigment which comprises depositing in situ upon the surface and in the interstices of the titanium dioxide pigment particles the solid product of the complete hydrolysis of a salt of a volatile acid selected from the group consisting of hydrochloric, formic, acetic, propionic and butyric acids and of a metal selected from the group consisting of aluminum, antimony, tin and bismuth.

15. The process of improving the resistance to weathering, chalking, fading and discoloration of titanium dioxide pigment which comprises depositing in situ upon the surface and in the interstices of the titanium dioxide pigment particles the solid product of the complete hydrolysis of a salt of aluminum and of a volatile acid selected from the group consisting of hydrochloric, formic, acetic, propionic and butyric acids.

16. The process of improving the resistance to weathering, chalking, fading and discoloration of titanium dioxide pigment which comprises forming an aqueous slurry of the titanium dioxide pigment containing in solution an easy hydrolizable salt of a volatile acid selected from the group consisting of hydrochloric, formic, acetic, propionic and butyric acids and of a metal other than titanium whose hydroxide is white, thoroughly soaking the titanium dioxide pigment particles with said salt, then boiling to completely hydrolize the salt upon the surface of said particles and the salt penetrated into the interstices of said particles to form upon the surface of said particles and within the interstices thereof deposits of the solid product of the hydrolysis and drying the pigment.

17. The process of improving the resistance to weathering, chalking, fading and discoloration of titanium dioxide pigment which comprises forming an aqueous slurry of the titanium dioxide pigment containing in solution an easy hydrolizable salt of a volatile acid selected from the group consisting of hydrochloric, formic, acetic, propionic and butyric acids and of a metal selected from the group consisting of aluminum, antimony, tin and bismuth, thoroughly soaking the titanium dioxide pigment particles with said salt, then boiling to completely hydrolize the salt upon the surface of said particles and the salt penetrated into the interstices of said particles to form upon the surface of said particles and within the interstices thereof deposits of the solid product of the hydrolysis and drying the pigment.

18. The process of improving the resistance to weathering, chalking, fading and discoloration of titanium dioxide pigment which comprises forming an aqueous slurry of the titanium dioxide pigment containing in solution an easy hydrolizable salt of aluminum and of a volatile acid selected from the group consisting of hydrochloric, formic, acetic, propionic and butyric acids, thoroughly soaking the titanium dioxide pigment particles with said salt, then boiling to completely hydrolize the salt upon the surface of said particles and the salt penetrated into the interstices of said particles to form upon the surface of said particles and within the interstices thereof deposits of the solid product of the hydrolysis and drying the pigment.

19. The process of improving the resistance to weathering, chalking, fading and discoloration of titanium dioxide pigment which comprises forming an aqueous slurry of the titanium dioxide pigment containing in solution an easy hydrolizable salt of antimony and of a volatile acid selected from the group consisting of hydrochloric, formic, acetic, propionic and butyric acids, thoroughly soaking the titanium dioxide pigment particles with said salt, then boiling to completely hydrolize the salt upon the surface of said particles and the salt penetrated into the interstices of said particles to form upon the surface of said particles and within the interstices thereof deposits of the solid product of the hydrolysis and drying the pigment.

20. The process of improving the resistance to weathering, chalking, fading and discoloration of titanium dioxide pigment which comprises forming an aqueous slurry of the titanium dioxide pigment containing in solution an easy hydrolizable salt of tin and of a volatile acid selected from the group consisting of hydrochloric, formic, acetic, propionic and butyric acids, throughly soaking the titanium dioxide pigment particles with said salt, then boiling to completely hydrolize the salt upon the surface of said particles and the salt penetrated into the interstices of said particles to form upon the surface of said particles and within the interstices thereof deposits of the solid product of the hydrolysis and drying the pigment.

BENJAMIN WILSON ALLAN.
WILLIAM EVERETT LAND.